United States Patent [19]

Arai

[11] Patent Number: 5,075,701

[45] Date of Patent: Dec. 24, 1991

[54] THERMAL RECORDING HEAD HAVING GROUP-WISE ACTUABLE HEATING ELEMENTS

[75] Inventor: Shoji Arai, Kyoto, Japan

[73] Assignee: Matsushita Electric Industrial Co., Ltd., Osaka, Japan

[21] Appl. No.: 553,421

[22] Filed: Jul. 17, 1990

[51] Int. Cl.[5] .................. G01D 15/10

[52] U.S. Cl. .................. 346/76 PH

[58] Field of Search .................. 346/76 PH

[56] References Cited

U.S. PATENT DOCUMENTS

| | | | |
|---|---|---|---|
| 4,395,146 | 7/1983 | Arai | 400/120 |
| 4,492,482 | 1/1985 | Eguchi et al. | 400/120 |
| 4,779,102 | 10/1988 | Sasaki | 346/76 PH |

FOREIGN PATENT DOCUMENTS

| | | | |
|---|---|---|---|
| 0003246 | 1/1978 | Japan | 346/76 PH |
| 0079977 | 5/1985 | Japan | 346/76 PH |
| 0190367 | 9/1985 | Japan | 346/76 PH |
| 0173660 | 7/1988 | Japan | 346/76 PH |
| 63-216764 | 9/1988 | Japan . | |

OTHER PUBLICATIONS

Anderson et al., "The Development of 8″-100 1 pi Thick-Film Thermal Printheads", pp. 24–30, Int'l Hybrid Microelectronics, vol. 4, No. 1 (Spring '81).

*Primary Examiner*—Benjamin R. Fuller
*Assistant Examiner*—Nancy Le
*Attorney, Agent, or Firm*—Stevens, Davis, Miller & Mosher

[57] ABSTRACT

A thermal recording head and system including a plurality of heating elements ranged in one line, wherein N groups of heating elements are sequentially selected to be actuated by selecting a respective one of every N number of adjacent heating elements in order for N times of divisional recording for one line.

5 Claims, 9 Drawing Sheets

THERMAL RECORDING HEAD HAVING GROUP-WISE ACTUABLE HEATING ELEMENTS

BACKGROUND OF THE INVENTION

The present invention relates to a method for arranging a higher density and less expensive thermal-recording head.

The thermal recording system includes a recording unit operated in a serial printer or line printer mode.

The serial-printer-mode recording unit employs a recording head consisting of at most one hundred heating elements. The line-printer-mode recording unit, on the other hand, requires a recording head consisting of several thousands of heating resistive elements arranged in a line. In order to heat such a great number of heating elements in response to a recording signal, the following types of recording heads have been developed;

1. Diode Matrix Type

At a first phase, this type of recording head has been employed in a facsimile machine. It results in giving an opportunity of developing a thermal recording system. The diode matrix type recording head is designed to use a group of 32 to 64 heating elements as a single unit for recording. It thus takes several hundred mm seconds to record one line. To reducing the recording time per line to several mm seconds by concurrently heating many heating elements, there have been the following types of systems developed: 2. Thyristor Array Type and 3. Semiconductor IC Mount Type. Today, the thermal recording system normally employs a semiconductor IC mount type for thermal printing.

Accompanying the improvement of the recording heads, relevant matters have been also developed such as arrangements of a recording unit, including how to contact a recording paper with a head and send a recording paper, improvement of color type thermal recording paper and development of transfer type recording paper. These developments have resulted in recognition of the thermal recording system as being easily handled and maintained and such systems have been commercially popular. The system thus applies to various kinds of fields such as:

(a) Facsimile using color type thermal paper and some kinds of printers; and (b) Monotone printer, and multi-color or full-color printer using heat fusion type or sublimation type imprint paper, image-receiving paper.

FIGS. 1A to 1D show circuit arrangements of a recording pattern, arrangement of a heating section and an overall recording head used in a conventional semiconductor IC mount type recording head.

FIG. 1A shows a recording pattern used in the conventional recording head, wherein 18 resistive segments arranged in a line are divided in three groups for recording. In this Figure, one square corresponds to one recording dot and a numeral shown in the square indicates how to divide the heating segments for actuating them and a heating (=recording) order.

The conventional semiconductor IC mount type recording head, as shown in FIG. 1A, is designed to divide the eighteen resistive segments into three groups, each of which is a single recording unit consisting of adjacent six segments. Since the eighteen heating elements are arranged exactly in a line, the divisional recording system slightly shifts recording positions of second and third recorded dots relative to the recording position of the first recorded dots in the feeding direction of the recording paper.

FIG. 1B shows an arrangement of the heating unit of the conventional semiconductor IC mount type recording head.

In FIG. 1B, the numerals denote these portions or elements:

100: Overall arrangement of the heating unit of the conventional recording head
1: Heating element
2: Common electrode
3: Individual electrode
4: Transistor
6: Power source for energizing heating elements
20: Semiconductor IC As shown in FIG. 1B, the heating unit of the conventional IC-type head is configured to connect a collector of each semiconductor IC transistor 4 to one end of each of the heating elements 1 arranged in a line, connect the other end of each heating elements 1 and an emitter of each transistor 4 to a power source 6 for actuating the heating elements and actuate each of N groups composed of all the heating elements in the order for recording. That is, in FIG. 1B, at first, recording signals are applied to the semiconductor ICs 20 so as to switch on the transistors 4 connected to the first to sixth heating elements 1 as viewed from the right. Next, by the succeeding operation, the seventh to twelfth and the thirteenth to eighteenth heating elements are actuated (heated). These operations result in providing a divisional recording pattern for one line of N=3 as shown in FIG. 1A.

FIG. 1C shows an example of overall circuit illustrating the conventional IC-type head, wherein:

101: Conventional IC-type recording head circuit
7: Power source for semiconductor IC
20: Conventional semiconductor IC circuit The IC circuit 20 comprises:

11: shift register for transferring a recording signal
12: latch circuit for temporarily storing a recording signal
13: gate circuit for supplying a recording signal of a latch circuit
4: transistor for supplying a recording output (actuating a heating element)

The terminals of the semiconductor IC 20 are respectively connected to the eighteen elements 1 as shown for forming:

recording head actuating terminal: 101$a$, $c$ to 107.

The terminals 104 and 105 are connected to the semiconductor IC power source 7.

The recording head is designed to apply a one-line recording signal to the terminal 101$a$, transfer the recording signal sequentially through the eighteen shift register circuits 11 in response to a clock signal from the terminal 101$b$, and temporarily store the recording signal transferred by a latch signal from the terminal 102 in the eighteen latch circuits 12.

In response to a gate signal applied to the terminal 103, the first to sixth transistors 4 as viewed from the right hand side become conductive in response to the recording signals stored in the corresponding latch circuits. Then, the six heating elements 1 connected to the conductive transistors 4 are heated up by the power source 6 for actuating the heating elements, the power source being connected to the terminals 106 and 107. Succeeding to a signal application to the terminals 103$b$ and 103$c$, the seventh to twelfth and the thirteenth to eighteenth heating elements are heated up, resulting in the one-line recording as shown in FIG. 1.

During a period of recording one line, the next line signal is applied to the terminal 101*a* for preparing the succeeding next line recording. Likewise, the subsequent lines are recorded in the divisional recording mode. In addition, 104 and 105 denote semiconductor IC power terminals of the recording head.

The foregoing three types of recording heads:

1. Diode Matrix Type
2. Thyristor Array Type
3. Semiconductor IC Mount Type have respective circuit arrangements according to the semiconductor devices connected to the heating elements. However, the feature of dividing the heating elements for one line recording as in FIGS. 1A and B is common to these three heads.

The shortcoming of the arrangement of the heating unit shown in FIG. 1B is to require connection of heating resistive elements to semiconductor devices (diode array, thyristor array or output transistor array) in one-to-one relationship by a high density lead line pattern. That is, the manufacture of a heating element actuating type recording head as shown in FIG. 1B becomes more difficult as the array density of the heating elements becomes higher.

For the above reason, today:

(1) the high-density thermal recording head has a limitation to array density, that is, 16 dots per millimeter. To solve is shortcoming, the simultaneous formation of the heating elements and the semiconductor IC devices is being developed using a thin film forming technique but is still not put into practice; and (2) the connection between the heating elements and the semiconductor devices with a high-density lead line makes it difficult to lower the manufacturing cost of semiconductor IC-type head by the conventional manufacturing technique.

SUMMARY OF THE INVENTION

The present invention is implemented for the main purposes of:

(1) realization of a high-density recording head, and (2) reduction of the cost of the recording head, by lessening the quantity of semiconductor devices required for the recording head and lowering a density of connection between the heating elements and the semiconductor devices.

It is therefore a first object of the present invention to provide a high-density thermal recording head which has a density of 16 or more dots per millimeter and can be produced by the conventional head manufacturing technique.

It is a second object of the present invention to reduce the manufacturing cost of the head with a density of 6 to 12 dots per millimeter which is most frequently used.

To achieve the foregoing objects, the present invention employs a divisional recording system of heating elements. That is, the invention comprises:

(1) means for selecting a heating element one by one from among adjacent N heating elements and dividing all the heating elements into N groups, and (2) means for simultaneously heating selected one element of all the groups, whereby the heating elements arranged in one line are divided into N groups for recording.

BRIEF DESCRIPTION OF THE DRAWINGS

FIGS. 1A to 1D are views illustrating a conventional thermal recording system, wherein FIGS. 1A shows a recording pattern used in a conventional divisional recording system, FIG. 1B arrangement of a heating unit used in the conventional recording head, FIG. 1C a conventional semiconductor IC-type head circuit, and FIG. 1D a heating unit of a switching element type recording head employing the conventional divisional recording system, FIGS. 2A–2C are views illustrating a thermal recording system according to the invention, wherein FIG. 2A shows a recording pattern used in a divisional recording system according to the invention, FIG. 2B shows arrangement of a heating unit used in a common electrode divisional type recording head according to the invention, and FIG. 2C shows arrangement of a heating unit used in a switching element type recording head according to the invention;

FIGS. 4A–4B are views illustrating a concrete example of a common electrode divisional system recording head according to the invention; wherein FIG. 4A shows a common electrode divisional system circuit, and FIG. 4B shows a circuit showing the appearance of a common electrode divisional system recording head having a semiconductor IC mounted by a wire-bonding technique;

FIG. 5 are views illustrating a concrete example of a switching element system recording head according to the invention, wherein FIGS. 6A–6C are views illustrating how to improve a recording speed by setting a more coarse recording density of the heating elements in the arranging direction according to the invention, wherein FIG. 6A shows a recording pattern for normal recording, FIG. 6B shows a recording pattern formed on the conventional simplification recording system using a recording head formed according to the invention, and FIG. 6C shows a recording pattern used according to a new simple recording method of the invention.

DESCRIPTION OF PREFERRED EMBODIMENTS

Figure 1A:
FIG. 1A PRIOR ART
Figure 1B:
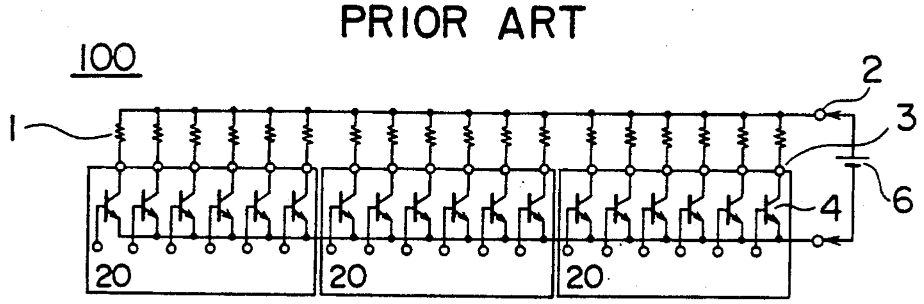
FIG. 1B PRIOR ART
Figure 2A:

FIG. 2A shows a one-line recording pattern formed in the case where a divisional recording system of the invention performs recording by dividing eighteen resistors arranged in a line into three groups. The way of illustration of FIG. 2A is similar to that in FIG. 1A.

For recording one line, the present invention is designed to actuate, at first, a first group of the first, 4-th, 7-th, 10-th, 13-th and 16-th resistors for recording the corresponding dots as viewed from the left hand side and then to repeat the similar divisional recording twice.

Since one line is recorded in the foregoing order of the resistors, the present recording system is more likely to shift the recording dots out of proper positions than the conventional recording system. This shortcoming can be prevented by shifting the heating element arrangement in the travelling direction of the recording paper.

Figure 2B:
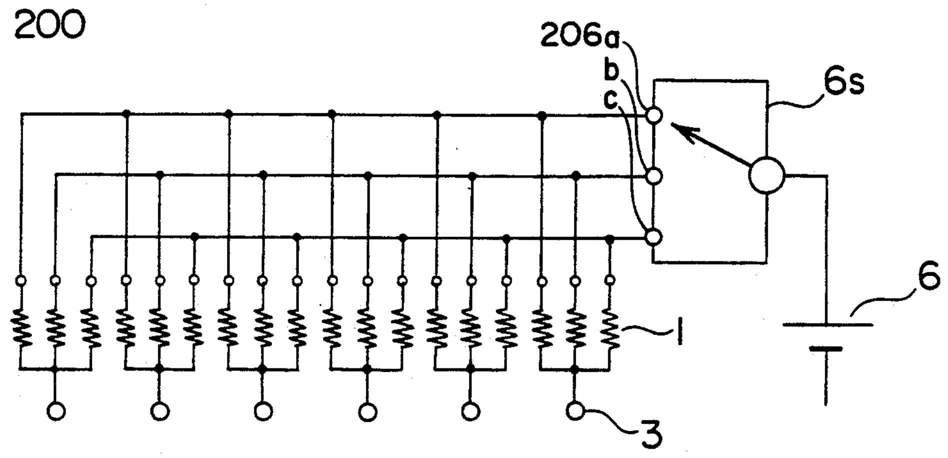
Figure 2C:
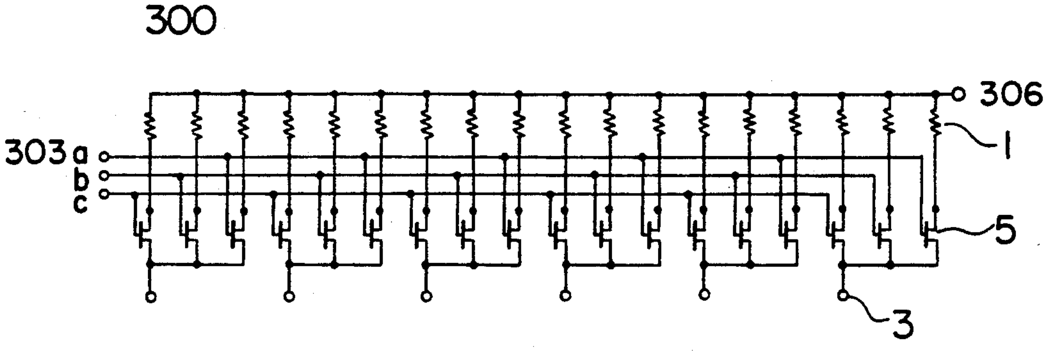

FIGS. 2B and 2C show arrangements of two heating units according to the present invention for performing the divisional recording described with reference to FIG. 2A.

FIG. 2B shows a heating unit 200 employs a common electrode divisional system according to the invention. This heating unit comprises heating elements 1 arranged in one line, (1) three common electrodes 206*a, b, c*, each of which is commonly connected to the terminals of the heating elements selected respectively from each group consisting of adjacent three heating elements, and (2) a plurality of individual terminals commonly connected to the other terminals of the adjacent N heating elements.

This recording head has a switch circuit for switching a heating power source 6*s*. For performing the recording described with reference to FIG. 2(*a*), the recording head operates the switch to:

(3) connect the power source 6 for actuating the heating elements to three common electrodes 204*a, b, c* sequentially, and (4) switch on or off the transistors connected to each individual terminal 3 in synchronization with the operation of (2) in response to a recording signal.

FIG. 2C shows a heating unit 300 employing a switching element system according to the invention. The heating unit comprises a plurality of heating elements 1 and switching elements 5 (for example, field-effect transistors) ranged in one line, (1) a common terminal 306 commonly connected to the terminals of the heating elements 1, (2) a plurality of individual terminals 3 connecting the other terminals of the heating elements 1 to the terminals of the switching elements 5 and commonly connecting the other terminals of the adjacent three switching elements with one another, and (3) divisional recording signal input terminals 303*a, b, c*, each of which is commonly connected to the switching signal terminals of switching elements 5 each selected sequentially respectively from each group consisting of three adjacent switching elements 5.

For performing the recording described with reference to FIG. 2A, this type recording head operates to:

(4) connect the power source 6 for actuating the heating elements to the common terminal 306, and (5) sequentially select a group of heating elements in response to a divisional recording signal serially applied to the three switching terminals 303*a, b, c* and switch on and off the transistors mounted on the semiconductor IC connected to the individual electrodes 3 in response to a recording signal synchronized with the divisional recording signal.

Figure 1D:
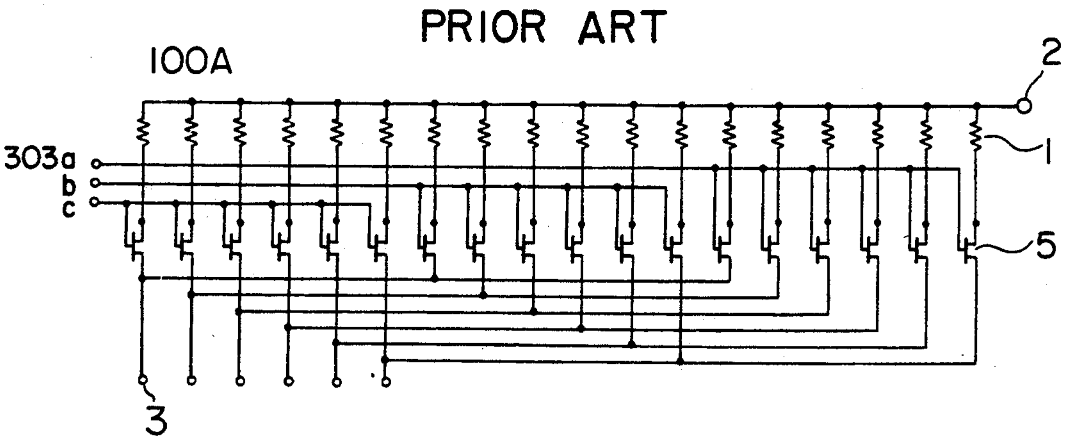
FIG. 1D PRIOR ART
Figure 1C:
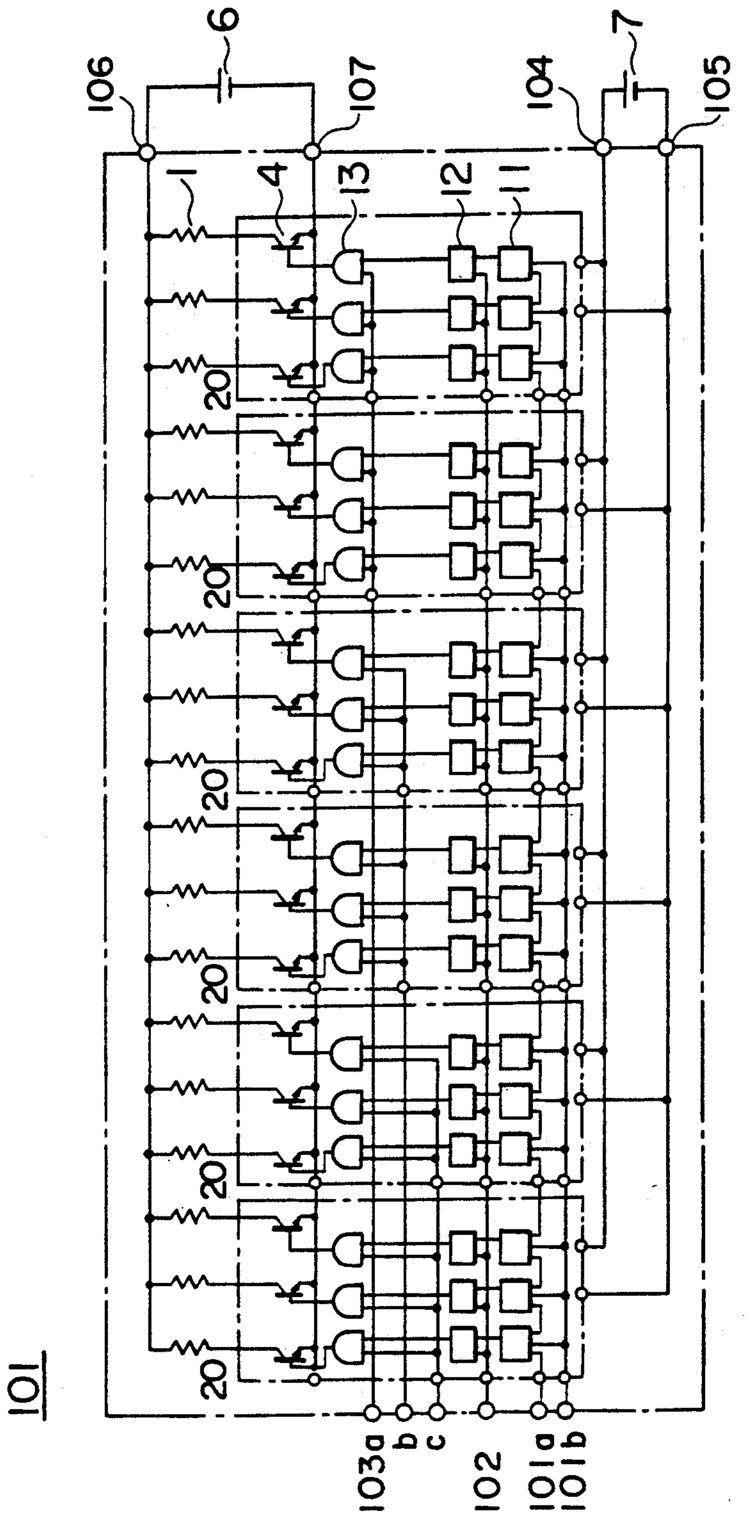
FIG. 1C PRIOR ART

As will be understood from the foregoing description of FIG. 1C, it is necessary to provide the same number of transistors 4 mounted on the semiconductor IC as the heating elements for fabricating the conventional IC-type recording head.

On the contrary, the present invention reduces the number of transistors 4 mounted therein to 1/divisional number of recordings.

As such, this invention reduces the number of transistors included therein to a greater extent than the conventional recording head arrangement. It is thus possible to achieve the main purposes of the invention, that is, high recording density and less expensive recording head.

As described above, the thermal recording system mainly employ an IC type recording head, because a one-line recording time is shortered as:

one-line recording time = divisional number of recordings × (multiplied by) width of a pulse for actuating the heating elements. (1)

The above equation has no concern with the sum of the heating elements included in the recording head.

Hence, it is impractical to increase the divisional number of recordings too much. However, to ensure uniform recording quality and to increase the heating elements-life, the divisional recordings of the relation $N=3$ to 5 is necessary to cool the heating element during a triple to fivefold period of a pulse width for actuating the heating elements. Hence, as a design of a concrete recording head, assuming that:

divisional number of recordings $N=4$ leading wires between heating elements and semiconductor ICs = 8 per millimeter, the conventional manufacturing technique makes it possible to manufacture the recording head arranged to have 32 dots/mm as shown in FIG. 2B.

For manufacturing the most frequently used recording head arranged to have 8 to 12 dots/mm, the recording head is made less costly by reducing to 1/N:

(1) the number of semiconductor ICs (2) leading wires connecting between heating elements and semiconductor ICs For reference, FIG. 1D shows arrangement of a switching element system heating unit employing the conventional divisional recording system. The function of each terminal is similar to that shown in FIG. 2B. Thus, these terminals reference by like numerals are not explained.

As will be understood from FIG. 1D, the conventional divisional recording system for the heating elements is designed to disperse to various locations the heating elements connected to the individual terminals 3 on the overall width. Hence, as the heating members increase in number the connection of a leading wire for forming individual terminals is made surprisingly more complicated. It is a great obstacle to the arrangement of a concrete head.

It should be noted that the divisional recording system of the invention described with reference to FIG. 2A is an indispensable method for reducing the number of semiconductor ICs and leading wires of the semiconductor ICs.

(EMBODIMENT 1) SEMICONDUCTOR IC

The recording head of the invention may be arranged by the conventional semiconductor IC 20. This recording head, however, requires the change of a transferring order of a recording signal outside of itself.

Figure 3:
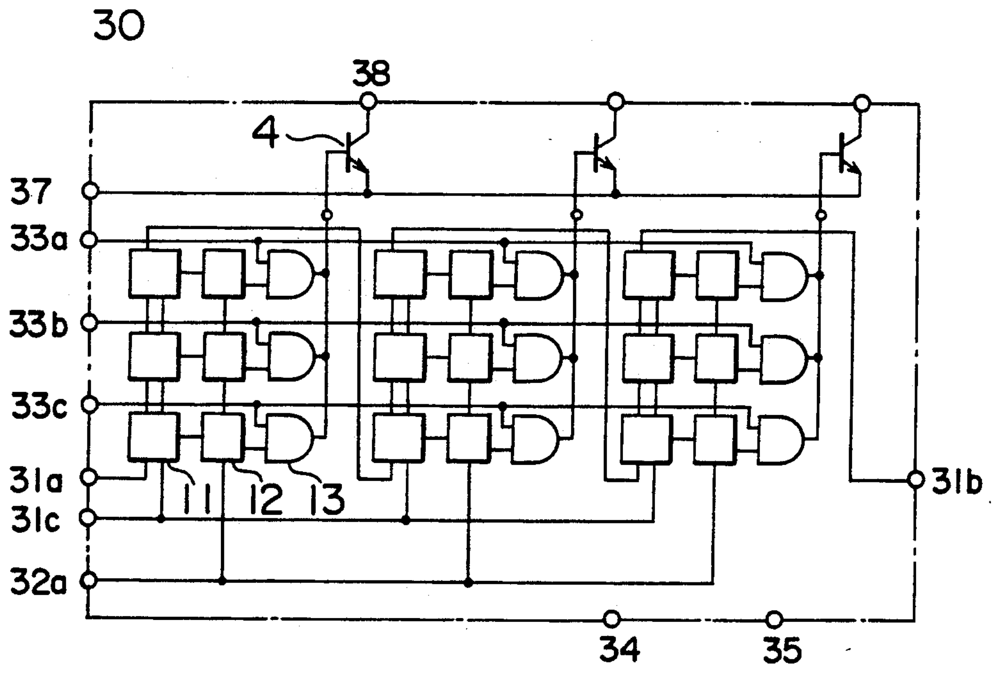
FIG. 3 is a view illustrating arrangement of a semiconductor IC.

FIG. 3 is a circuit diagram of a semiconductor IC according to the present invention. The semiconductor IC is arranged to change the order of a recording signal for the conventional recording head inside of it and actuate the heating elements in the order shown in FIG. 2B. FIG. 3 shows a circuit diagram showing an overall semiconductor IC 30 according to the invention. Like the conventional semiconductor IC, this semiconductor IC comprises:

11: shift registers for transferring recording signals,
12: latch circuits for temporarily saving the recording signals,
13: gate circuits for outputting the recording signals of the latch circuits, and
4: transistors for outputting the recording signals (actuating the heating elements).

The semiconductor IC has three functions of:

(1) applying a next one-line recording signal to a terminal 31*a* during a period of heating one-line heating elements, sequentially transferring the recording signals through nine shift register circuits 11 in response to a clock signal applied on a terminal 31*c*, and outputting the recording signals to the terminal 31*b*,
(2) temporarily storing the recording signals in nine latch circuits 12 in response to a latch signal applied on the terminal 32*a*,
(3) outputting to three transistors 4 the recording signals of

| | | | | | |
|---|---|---|---|---|---|
| 1st, | 4th, | 7th, | 10th, | 13th, | 16th |
| 2nd, | 5th, | 8th, | 11th, | 14th, | 17th |
| 3rd, | 6th, | 9th, | 12th, | 15th, | 18th |

in response to the gate signals applied on the terminals 33*a*, *b* and *c*. In addition, 34 and 35 each denote a power terminal provided in the semiconductor IC. 37 and 38 denote terminals led to the collectors and emitters of the transistors.

The semiconductor IC 30 has a somewhat enlarged chip size because of a large number of circuits (shiftregister 11, latch 12 and gate 13), though, it is still practical in that:

(a) the chip size is not increased so much since the transistor 4 occupies large area, and
(b) the recording head requires only 1/N semiconductor ICs.

(EMBODIMENT 2) COMMON ELECTRODE DIVISION TYPE HEAD

The present embodiment describes the common electrode division type head according to the invention. The recording head mounts the semiconductor ICs 30 by a wire-bonding technique.

Figure 4A:
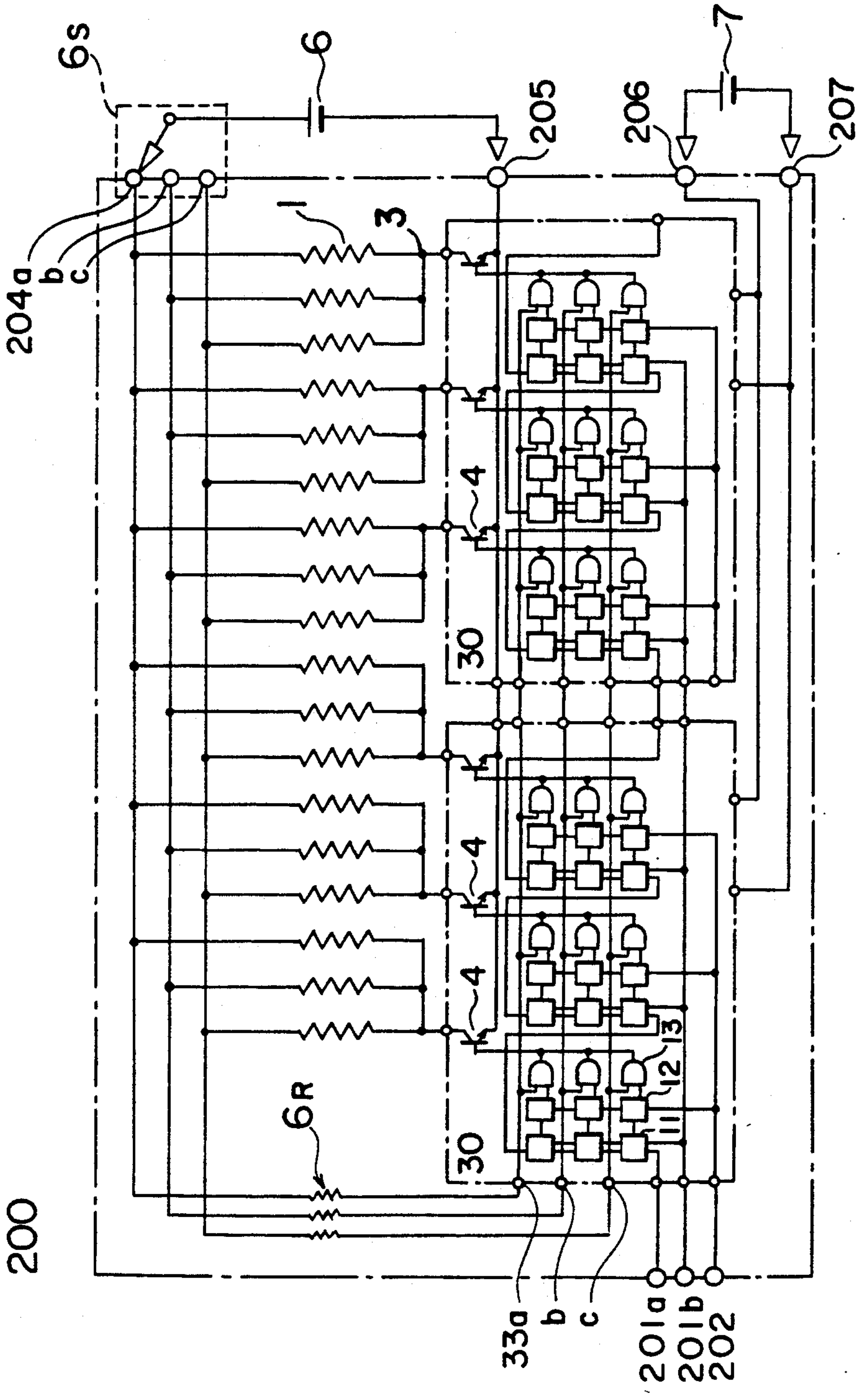

FIG. 4A is a circuit illustration showing a common electrode division type head 200 employing the semiconductor ICs 30 according to the invention. In this circuit, the terminals of the semiconductor ICs 30 are respectively connected to eighteen resistors 1 for forming recording operation terminals 201*a*, *c* to 207.

The recording head shown in FIG. 4A operates to:

(1) apply a next one-line recording signal to the terminal 201*a* during a period of actuating one-line heating elements and sequentially transfer the recording signals to eighteen shift register circuits 11 in response to the clock signal applied on the terminal 201*b*,
(2) temporarily store the recording signals in eighteen latch circuits 12 in response to the latch signal applied to the terminal 202,
(3) sequentially connect the terminals 204*a*, *b*, *c* to a power source for actuating the heating elements with a switching circuit 6*s*, and
(4) switch on and off six transistors 4 in response to a gate signal applied to the gate circuit 12 with the switching operation and simultaneously actuate each group of the heating elements 1 of:

| | | | | | |
|---|---|---|---|---|---|
| 1st, | 4th, | 7th, | 10th, | 13th, | 16th |
| 2nd, | 5th, | 8th, | 11th, | 14th, | 17th |
| 3rd, | 6th, | 9th, | 12th, | 15th, | 18th |

for continuously performing the divisional recording of each line. The above ordinal numbers are counted from the right hand side.

Having the switching circuit 6*s*, the recording head shown in FIG. 4A is arranged to synchronize the switching connection of the terminals 204*a*, *b*, *c* to the power source and the switching operation of the gate signal by the connection of the three common electrodes 204*a*, *b*, *c* respectively to the gate signal terminals 33*a*, *b*, *c*. 6R denotes a resistor, which serves to adjust a voltage level of the gate signal for the synchronization by the above connection. Further, 205 denotes a terminal led to the power source for actuating the heating elements. 206 and 207 each denotes a terminal led to a semiconductor IC power source.

As will be understood from the above explanation, the recording head of this embodiment can be operated similarly with the conventional semiconductor IC type recording head by the same recording signal as conventional IC-type head.

Figure 4B:
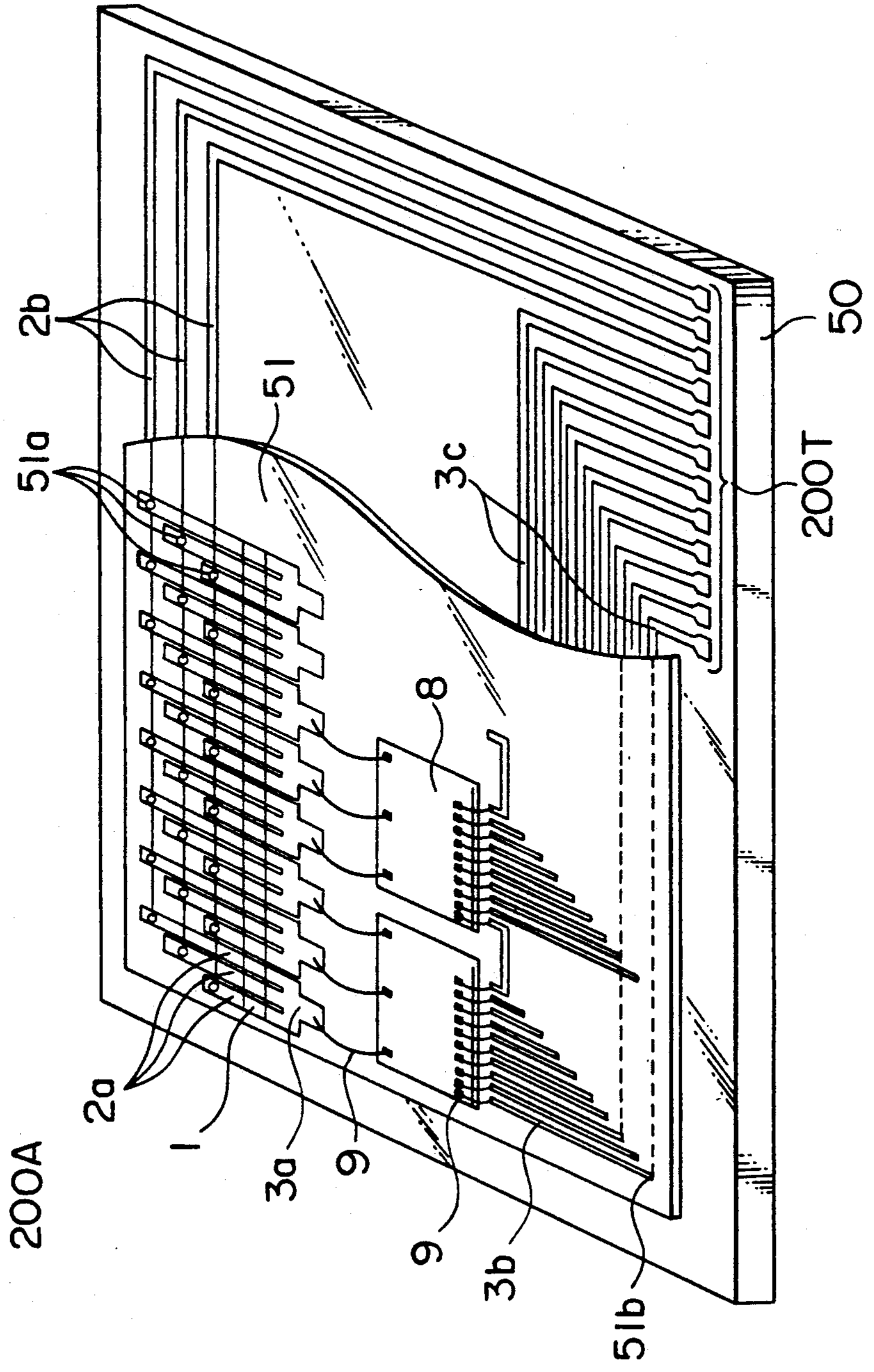

FIG. 4B shows the concrete structure of the recording head 200 having semiconductor ICs mounted by a wire-bonding technique.

In FIG. 4B, 200A is a view showing an overall recording head and 200T is a view showing a group of terminals provided in the recording head, wherein:

1: heating elements arranged in one line,
2*a*: a common electrode lead of the heating elements,
2*b*: wiring conductors for forming common electrodes of the heating elements,
3*a*: individual electrode leads for the heating elements,
3*b*, 3*c*: wiring conductors for forming a multilayer wiring portion of terminals for driving the semiconductor ICs,
50: substrate on which the heating elements are mounted,
51: thermal and electric insulating layer, and
8: silicon chip of semiconductor IC circuit.

In addition, for easier understanding of the figure, there is not shown a wear-resisting layer on the heating element for preventing contact wear with a thermal recording paper.

The recording head shown in FIG. 4B comprises a substrate 50 on which a thermal and electric insulating layer 51 (for example, a glass layer of about 20 microns) is formed. A layer of the heating elements, and a layer of common electrode and individual electrode lead are formed on the thermal and electric insulating layer 51 by a thin film forming technique. A patterning technique is applied to form the heating elements 1 ranged in one line, common electrode leads 2*a* of the heating elements, individual electrode leads 3*a* of the heating elements and multilayer wiring leads 3*b*.

Between the substrate 50 and the thermal and electric insulating glass layer 51 are formed three conductors 2*b* serving as the common electrodes for the heating elements. Each common electrode lead 2*a* is connected to the corresponding conductor 2*b* every two other leads via respective through hole 51*a* formed in the glass layer.

Every three individual electrode leads 3*a* of the heating elements are patterned to be electrically in unit, and the end portion of leads 3*a* are connected to each transistor formed in the semiconductor IC.

Wiring leads 3*b* are formed by patterning simultaneous with the patterning of the electrode leads 2*a* and 2*b* formed with a spacing slightly longer than the length of the IC from the connecting portion of the transistor and serve to collect the driving terminals of the semiconductor ICs in order to forming a main terminal of the recording head. The wiring leads 3*b* are electrically connected to the wiring conductors 3*c* of the operating terminal of the recording head via respective through holes 51*b*.

A semiconductor silicon chip 8 is bonded in a space between the individual electrode leads 3*a* and the wiring leads 3*b*. Also, by a wire-bonding technique, gold wires 9 are connected between the individual electrodes 3*a* of the heating elements and the pad portions of the transistors of each semiconductor IC and also between the pad portions of the driving terminals of the semiconductor IC and the wiring leads 3*b*. This finishes the electric circuit connection of the main portion shown in FIG. 4B except connection between 33*a*, *b*, *c* and 204*a*, *b*, *c*.

Figure 5A:
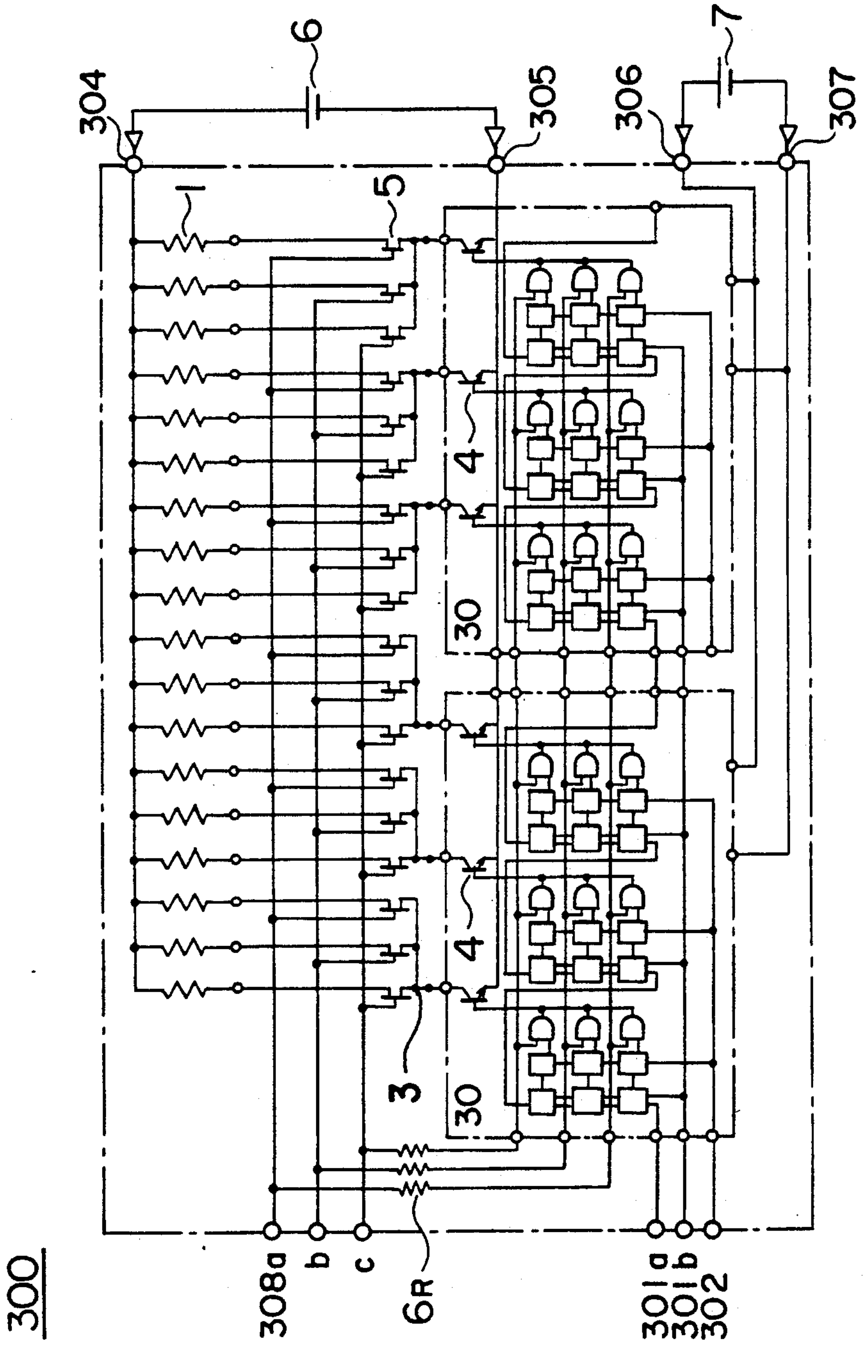
FIG. 5A shows a switching element system circuit.
Figure 5B:
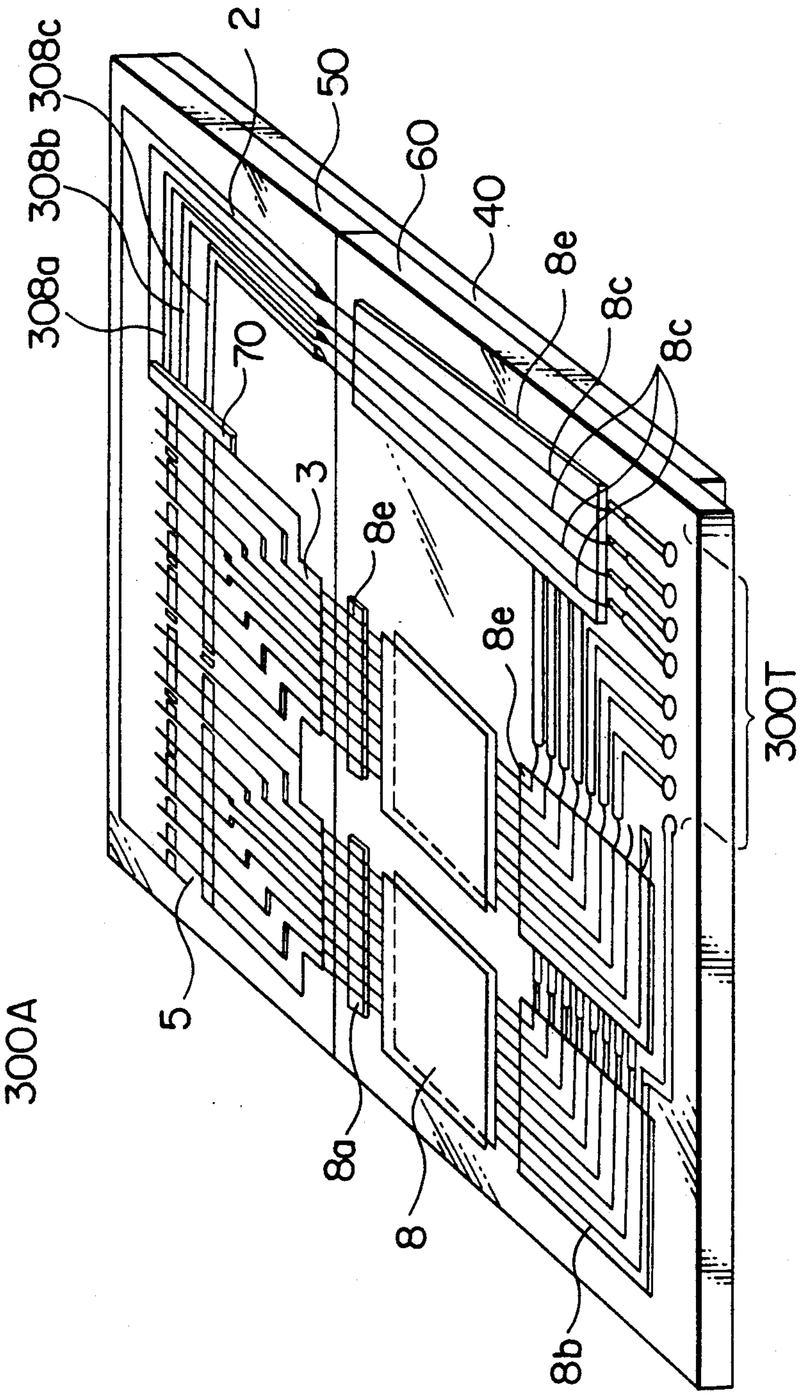
FIG. 5B shows appearance of a switching element system recording head having a mounted semiconductor IC with a TAB system.

Further, though not shown, with the process for forming the heating elements, it may be possible to form a resistor 6R for adjusting a voltage level of the gate signal shown in FIG. 5B on the substrate 50 on which the heating elements are mounted.

Moreover, for simplifying the manufacture process and reducing the manufacture cost, the structure of the recording head may have the improved features of:

1. making it easy to form the high density through-holes 51*a* and 51*b* by forming the layer of grass beneath the resistive elements 1 and the layer of polynidefilm beneath the leads 2*a* and 3*b*.
2. changing the pattern shape form of the conducting layer for forming the multilayer wiring portion of the semiconductor IC, which connects from the terminal group 200T of the recording head to a connector through a flexible film, and
3. commonly connecting the common electrode 2*a* of the heating elements to the respective lead for a gate signal in order to reduce the number of leads contained in the recording head.

Further, with reference to the present embodiment, it is possible to manufacture a recording head using another semiconductor IC mounting technique.

(EMBODIMENT 3) SWITCHING ELEMENT TYPE RECORDING HEAD

This embodiment is of a switching element type recording head on which the semiconductor ICs are mounted by a TAB (Tape-Automated-Bonding) system.

FIG. 5A is a circuit illustration showing the switching element type recording head according to the invention, in which 301*a*, *b* to 307 denote terminals for recording operation.

The recording head shown in FIG. 5A operates to apply a next one-line recording signal to the terminal 301*a* during a period of actuating the one-line heating elements, sequentially transfer the recording signal through the eighteen shift register circuits 11 in response to a clock signal applied on the terminal 301*b*, temporarily store the recording signal in the eighteen latch circuits 12 in response to a latch signal applied to the terminal 301, and switch on and off the six transistors 5 by sequentially applying signals for selecting the divisional recording heating elements to the three terminals 308*a*, *b* and *c*. Based on the operation, the recording head performs the three divisional recordings for finishing the recording shown in FIG. 2A.

The terminals 308*a*, *b*, *c* shown in FIG. 5A are arranged to have two functions of:

1) selecting the divisional recording heating elements, and
2) outputting the recording signal stored in the latch circuit.

A resistor 6R is provided for adjusting a voltage level of a gate signal used for synchronization for the above common connection.

If the difference between the switching characteristics of the transistor 4 and the switching element 5 is a serious matter, it is possible to form separate circuit terminals for the two functions respectively.

In a recording head having each terminal for two functions, it is possible to have the longer time of selecting each group than time of heating elements for actuation >pulse duration time of a gate signal. It is possible to actuate such a particular heating as having overlapped heating times between groups of heating elements. In addition, 304 and 305 denote terminals led to a power source for actuating the heating elements, 306 and 307 denote terminals for a semiconductor IC power source.

The manufacture process of the recording head shown in FIG. 5A includes steps of:

(a) producing the heating elements and field-effect transistors formed of amorphous silicon thin film by a thin film forming technique and producing a high-density circuit connections as shown in FIG. 2C, and (b) electrically connecting the field-effect transistors with the semiconductor IC by the conventional mounting technique.

Further, at step (a), by using the output resistors of the field-effect transistors as the heating elements it is possible to further simplify the manufacture process of the recording head. This method makes it possible to (1) remove the step of forming the resistive elements as the conventional heating elements. And, if the output resistors of the field-effect transistors are made to serve as the heating elements, it is conventionally necessary to reduce the output resistance of each field-effect transistor to 1/10 or less of the conventional heating element resistance in order to suppress unnecessary power consumption. However, this present method assumes and relies on the relationship (2) of the output resistance of the field-effect transistor=the heating element resistance. (That is, 2 to make the output resistance=resistance of heating elements.) It results in mitigating the restriction against the output resistance of the field-effect transistor. Also, these two kinds of recording heads have the same circuit arrangements.

FIG. 5B shows the appearance of the semiconductor IC in which the output resistances of the field-effect transistors are used as the heating elements and the semiconductor ICs are mounted by the TAB (Tape-Automated-Bonding) system.

FIG. 5B shows the appearance of a recording head 300 A in which the semiconductor ICs are mounted by the TAB system, wherein 8 designates a silicon chip in which semiconductor ICs are mounted, 40 head base made of metal, 50 substrate on which heating elements are mounted, and 60 multilayer wiring printed board.

The following processes make it possible to form field effect transistor (TFT) and three type of electrodes on the substrate 50.

PROCESS 1

308*a*, 308*b*, 308*c*: three leads for divisional recording signals of the heating elements, each leads of which is commonly connected to every two other terminals for switching signals to the field-effect transistors.

PROCESS 2

70: thin film formed of two layers, that is, a dielectric layer and an amorphous silicon layer,

PROCESS 3

2: a single common electrode lead connecting drain electrodes and drains of the field-effect transistors, 3: a plurality of individual electrode leads connected to the source terminals of the respective adjacent three field-effect transistors. The common electrode lead 2 and the individual electrode leads 3 formed above the three leads 308*a*, *b*, *c* are electrically insulated by the thin film 70 made of the two layers of the dielectric layer and the amorphous silicon layer. For easier understanding of the figure, three field-effect transistors are denoted by 5, and also a wear-resisting layer for protecting them from contact wear with the thermal recording paper is not shown.

Substrate 50 for the heating elements and the multilayer wiring printed substrate 60 are supported on the metallic head base 40. A group of recording head terminals 300T such as terminals for applying recording signals to the semiconductor ICs, power source terminals, and leads which collect the power terminals for actuating the heating elements are formed on substrate 60.

The silicon chip 8 containing the semiconductor ICs 30 has the transistor terminals and the operation terminals of the semiconductor ICs connected to groups of straight leads 8*a* and L-character like leads 8*b*, respectively. The straight and L-like leads are supported on a film 8*a* and 8*b* made of polyimide resin by a TAB technique. One ends of straight and L-like leads are connected to silicon chips by ILB (Inner-Lead-Bonding). The other terminals of the straight and L-character-like lead group 8*a* and 8*b* is connected to:

(1) a plurality of individual electrode leads 3 connected to the source terminals of the field-effect transistor, (2) a group of leads forming the recording head terminals 300T, which are respectively formed by the TAB type OLB technique (Outer-Lead-Bonding). Further, with four leads 8*c* supported by the polyimide resin film 8*e*, (3) a common electrode lead 2 connected to the drains of the field-effect transistors, and (4) three switching signal terminals 308*a*, *b*, *c* of the field-effect transistors are connected to the group of leads 300T. Thus completed is the electric circuit connection of the recording head shown in FIG. 5A.

As will be understood from the above description, the recording head according to the invention can be manufactured by the prior art except the field-effect transistor.

With reference to this embodiment, it is possible to manufacture the recording head with the wirebonding technique, which is the most frequently used mounting technique of the semiconductor IC, and the other mounting technique.

(Embodiment 3) How to shorten a recording time by setting a more coarse or lower recording density in the arranging direction of the heating elements is next explained.

In the normal or usual recording operation, the present invention carries out the one-line recording by repeating a recording operation "n" times, wherein "n" indicates the number of the divisional recordings so named in the foregoing description, so the repeated operation is done by one n th of the heating elements (1/divisional number of recordings).

This divisional recording system can realize a new simplified recording for increasing the recording speed by the setting of:

one-line recording = one division recording

Figure 6A:
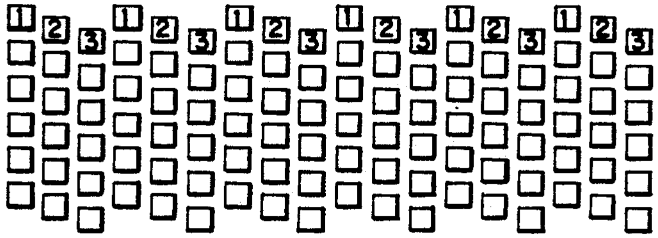
Figure 6B:
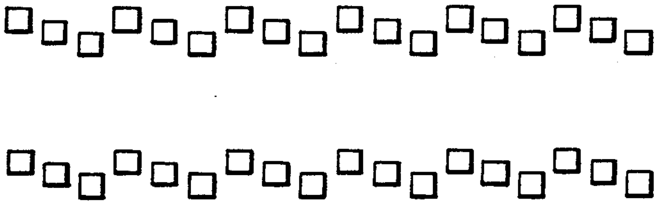
Figure 6C:
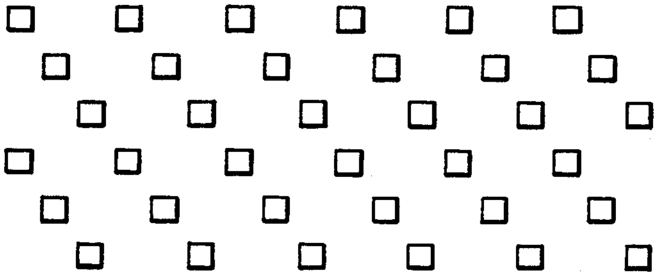

FIGS. 6A to 6C show three recording patterns according to the invention. In these Figures, one square corresponds to one recording dot.

FIG. 6A is a view showing how the recording dots are distributed in the usual (most precise) recording. As described with reference to FIG. 2A, the usual recording system according to this invention repeats the recording operation for a first one line in the order of numbers indicated in the square shown in FIG. 6A.

The conventional recording head carries out one line recording by every group of the heating elements grouped by the number (n) divisional recording times in accordance with the order of the arranged heating elements. For improving the recording speed, therefore, the conventional head employs a simplified recording method of repeating a recording operation of representing recording information of two or more lines by one-line recording in the feeding direction of the recording paper.

FIG. 6B shows recording dots corresponding to a first and a fourth line in the distribution of dots arranged in a conventional simplified recording method, wherein recording information for three lines is represented by one-line recording for reducing the recording time into ⅓.

The present invention can implement a simplified recording method which the conventional divisional recording method has been unable to meet. The distribution of the recording dots arranged in the simple field recording method is shown in FIG. 6C.

FIG. 6C shows a recording pattern by which the recordings for a first line, a second line, and a third line are respectively represented by the first, the second, and the third divisional recording in order to reduce the recording time into 1/9. The recording dots for the first to the sixth lines are shown in this Figure.

The simplified recording method illustrated in FIG. 6C has a feature of uniformly simplifying the information given in the main scanning direction (arranging direction of the heating elements) and sub-scanning direction (feeding direction of a recording paper). For example, using the four-divisional recording head of 16 dots/mm, this method can carry out the three types of recording of 4, 8, 16 dots/mm.

This method has another feature that the recording time ca be reduced into for 8 dots/mm, $\frac{1}{2}\times\frac{1}{2}=\frac{1}{4}$; and for 4 dots/mm, $\frac{1}{4}\times\frac{1}{4}=1/16$.

The conventional divisional recording method serves to reduce the recording time merely by reducing a recording density in the sub-scanning direction. Hence, the reduction of the recording time into 1/16 results in impractically deteriorating the recording quality. On the other hand, in the case of the present simplified recording of 4 dots/mm with the 16 dots/mm head, to prevent the overall density or concentration of recorded picture from being lowered, it is sufficient to increase the recording energy per dot for enlarging a recording dot size, in order to realize a practical recording.

The simplified recording system is a useful system in facsimile transmission for a short time or test printing done by a color printer employing a high-density recording head.

(EFFECT OF THE INVENTION)

As described above, the present invention employs a new simplified recording system in which the heating elements arranged in one line are divided into a plurality of groups, each of which does not contain the adjacent heating elements, and the groups are repetitively heated one by one for recording. Hence, the invention makes it possible to:

(1) reduce the number of semiconductor ICs serving to selectively heat the heating elements and the density of the connection between the heating elements and the leads, and manufacture a high-density recording head of 16 dots/mm or more which it has been difficult for the prior art to manufacture, and (2) reduce the number of semiconductor ICs mounted in the overall recording head and lower the cost of the recording head.

Hence, the present system offers some effects of:

(3) providing the arrangements of two concrete recording heads, that is, the common electrode division system and the switching element system, (4) illustrating the arrangement of a semiconductor IC which makes it possible to change the inputting order of the recording signals to the proper recording order for the divisional recording system according to the invention, and (5) offering a new simplified recording system for reducing a recording time by setting a more coarse density than the array density of the heating elements.

These effects make great contributions to improvement of the related arts relating to thermal recording systems. The present invention is useful in development of future thermal recording systems and is of great value in its industrial applications.

What is claimed is:

1. A thermal recording head, comprising:

(a) a plurality of heating elements arranged in a single line in groups consisting of N adjacent heating element;

(b) a plurality of semiconductor devices for providing recording signals;

(c) N common electrodes, each of which is commonly connected to a first terminal of one of the heating elements of each of said groups of adjacent N heating elements, (d) a plurality of individual terminals commonly connected respectively to all second terminals of the adjacent N heating elements of one of said groups of heating elements, (e) first switching means for sequentially connecting said N common electrodes to a power source for actuating the heating elements, (f) second switching means for selectively connecting said individual terminals to said semiconductor devices for actuating said heating elements in accordance with said recording signals, and (g) means for recording one line in response to N divisional recording signals provided by said semiconductor devices synchronized with sequential connection of said N common electrodes to said power source by said first switching means.

2. A thermal recording head as in claim 1 wherein said N common electrodes are connected through resistors to terminals provided in said semiconductor devices for providing signals to said first switching means to control actuation of said heating elements.

3. A thermal recording head comprising:

(a) a plurality of heating elements arranged in a single line;

(b) a plurality of switching elements arranged in a single line in groups consisting of N adjacent switching elements, said switching elements each having a first terminal connected to a second terminal of a respective one of said heating elements;

(c) a plurality of semiconductor devices;

(d) a common connection terminal commonly electrically connected to a first terminal of each of said heating elements;

(e) a plurality of individual terminal each of which is commonly connected respectively to a second terminal of all switching elements of one of said groups of switching elements;

(f) said semiconductor devices comprising a plurality of output circuits respectively connected to said individual terminals;

(g) a plurality of recording signal terminals;

(h) a plurality of conductors each respectively commonly connected via one of said recording signal terminals to a third switching signal terminal of one of said switching elements of each of said groups of switching elements, said recording signal terminals receiving division recording signals from said semiconductor devices to control grouping of all of said heating elements into N groups during recording;

said common connection terminal and a common terminal of each of said output circuits of said semiconductor devices being adapted to be connected to a power source for actuating said heating elements; and whereby one-line recording is performed in response to said division recording signals and recording signals provided by said output circuits of said semiconductor devices synchronized with said division recording signals.

4. A thermal recording head as claimed in claim 3 wherein the output resistances of the switching elements are served as heating elements.

5. A semiconductor device for a thermal recording head comprising a plurality of heating elements arranged in a single line, said semiconductor device comprising:

(a) means for sequentially transferring within said device recording signals applied in an arranged order of said heating elements, (b) means, responsive to completion of transfer of recording signals within said device for one line of recording, for (i) dividing said transferred recording signals into N signal groups, an inputting order of which are arranged as,

1, N+1, 2N+1, . . . . .
2, N+2, 2N+2, . . . . .
N, N+N, 2N+N, . . . . .

where N is a positive integer which is larger than one, and (ii) means for sequentially selecting said N signal groups and outputting them simultaneously.

* * * * *